United States Patent [19]

Charbonneau et al.

[11] Patent Number: 4,660,416

[45] Date of Patent: Apr. 28, 1987

[54] MOTOR OPERATED VALVE ANALYSIS AND TESTING SYSTEM WITH MONITORING OF SPRING PACK MOVEMENT THROUGH SIDE BY SIDE MONITORING DEVICE

[75] Inventors: Arthur G. Charbonneau; John A. McMennamy, both of Marietta; Steven Nafziger, Chamblee, all of Ga.

[73] Assignee: Charbonneau and Godfrey Associates, Marietta, Ga.

[21] Appl. No.: 818,331

[22] Filed: Jan. 13, 1986

Related U.S. Application Data

[63] Continuation-in-part of Ser. No. 741,861, Jun. 6, 1985, which is a continuation of Ser. No. 515,358, Jul. 19, 1983, Pat. No. 4,542,649.

[51] Int. Cl.⁴ .................... G01M 19/00; G01P 13/00
[52] U.S. Cl. .................... 73/168; 73/862.32
[58] Field of Search ............... 73/168, 862.19, 862.27, 73/862.31, 862.32; 137/551, 552; 251/129.03

[56] References Cited

U.S. PATENT DOCUMENTS

| | | | |
|---|---|---|---|
| 1,734,419 | 11/1929 | Chitty | 137/552 X |
| 1,908,763 | 5/1933 | Kelty | 137/552 |
| 1,979,340 | 11/1934 | Norman | 73/862.19 |
| 2,007,658 | 7/1935 | Panish | 137/552 X |
| 2,155,674 | 4/1939 | Morgan et al. | 73/862.31 X |
| 3,675,538 | 7/1972 | Keller et al. | |
| 4,085,624 | 4/1978 | Nomura | 74/89.15 |
| 4,193,720 | 3/1980 | Machida | 73/862.33 X |
| 4,194,393 | 3/1980 | Boley | 73/862.19 X |
| 4,255,967 | 3/1981 | Grymonprez et al. | 73/168 |
| 4,261,224 | 4/1981 | Sulzer | 74/626 |
| 4,435,979 | 3/1984 | Gilgore | 73/168 |
| 4,454,504 | 6/1984 | Jocz | 73/862.31 X |
| 4,542,649 | 9/1985 | Cherbonneau et al. | 73/862.32 X |
| 4,545,363 | 10/1985 | Barchechat et al. | 251/129.03 X |

FOREIGN PATENT DOCUMENTS

| | | | |
|---|---|---|---|
| 649617 | 12/1928 | France | 73/862.31 |
| 173182 | 7/1965 | U.S.S.R. | 73/168 |

OTHER PUBLICATIONS

"Electronic Torque Monitoring for Valve Drives"; vol. 60, pp. 169-171, *Sulzer Technical Review*; Apr. 1978, F. Konig.

*Primary Examiner*—Stewart J. Levy
*Assistant Examiner*—Tom Noland
*Attorney, Agent, or Firm*—Louis T. Isaf

[57] ABSTRACT

A system for measuring the operating characteristics of a valve and its operator and the corresponding imposed valve stem load is attached to the valve operator. A unique device and method are used to detect and measure movement of a valve operator spring pack to which access is had from the side of the spring pack. The invention provides initial dynamic traces after initial assembly, maintenance and/or periodic testing of the operator and valve. The invention is then used to provide diagnostic dynamic traces at any specified time in the future for the operator and valve. These future traces are used to compare with earlier traces to verify correct performance and most importantly to detect induced or impending damage, malfunctions, or maintenance requirements for the operator and valve.

3 Claims, 11 Drawing Figures

MOTOR OPERATED VALVE ANALYSIS AND TESTING SYSTEM WITH MONITORING OF SPRING PACK MOVEMENT THROUGH SIDE BY SIDE MONITORING DEVICE

This application s a continuation-in-part of application Ser. No. 741,861, filed June 6, 1985, entitled "MOTOR OPERATED VALVE ANALYSIS AND TESTING SYSTEM", which is a continuation of application Ser. No. 515,358 filed July 19, 1983, now U.S. Pat. No. 4,542,649 issued Sept. 24, 1985.

FIELD OF THE INVENTION

This invention relates generally to a system by which the overall performance and actual thrust loads delivered by an electromechanical, mechanical, pneumatic or hydraulic valve operator can be statically and dynamically monitored. Special emphasis is placed on new apparatus and methods for monitoring spring pack movement by an apparatus mounted piggy-back, or side-by-side, with the operator spring pack.

BACKGROUND OF THE INVENTION

Within the power industry, valves are operated remotely from open, closed and intermediate positions to improve or maintain utility power plant output, or in many cases to provide for the protection of the general public from release of radioactive materials either directlyor indirectly. Continual, proper operation of these valves is essential to the well-being of the industry and the general public. The extreme emphasis on safety in nuclear power plants (and the presently bad reputation of the nuclear industry) has put a premium on the importance of maintaining proper operation of valves, of which there may be hundreds within a single plant.

At the forefront of industry attempts to monitor and maintain proper operation of these critical valves is the recent invention of Arthur G. Charbonneau, et al described in U.S. Pat. No. 4,542,649 (hereinafter referred to as "649"). The 649 invention disclosed a new and important valve operator and monitoring system to measure, record and correlate valve stem load, limit and torque switch positions, spring pack movement and motor current providing time related information on valve performance. The information made available by the 649 patent provides a direct indication of developing valve and operator problems such as excessive or inadequate packing load, excessive inertia, proximity to premature tripping, incorrectly set operating limit and torque switches, improperly functioning thermal overload devices, inadequate or excessive stem thrust loads, gear train wear, stem damage, and load relaxation.

The prior 649 patent discloses a particular spring pack movement monitoring device to monitor the linear motion of the operator spring pack as one part of the information collection function of that invention. The 649 spring pack movement monitoring device makes use of an extension rod pressed against one end of the spring pack compression shaft (or thrust shaft) and held against the spring pack shaft by a tension system. The extension/rod device system of the 649 patent relies upon the extension rod contacting an element of the spring pack which moves in both (opposite) lineal directions in direct response to movement of the operator worm. The 649 spring pack movement monitoring device has, apparently, very valuable application when access can be had to the end of the operator spring pack.

However, the present inventors recognize that not all valve operators grant easy or practical access to the end of the spring pack and, thus, the extension rod and tension device assembly of the 649 specification will not work on all valve operators. An example of just such an uncooperative valve operator is that made by Jouvenel, and known as their L-type operator.

SUMMARY OF THE INVENTION

Briefly described, the present invention comprises a modification to the 649 Patent valve operator testing and analysis system. Such modification comprises a unique spring pack movement monitoring device which includes an apparatus for riding piggyback on the spring pack assembly of the valve operator to accurately detect movement of the spring pack through side access to the spring pack assembly. The apparatus of the present invention comprises two spring pack engaging elements which are moveable relative to oneanother. The two spring pack engaging elements of the apparatus will be termed herein as spring pack assembly engaging stylus. When the apparatus is mounted in place on the valve operator, each stylus engages a different, independently moveable portion of the spring pack assembly. the interrelationship of the spring pack assembly and the piggyback apparatus of the present invention is such that, as the spring pack is compressed in a first direction, the first stylus is held stationary by its engaged operator portion and the second stylus is moved in direction toward the first stylus. As the spring pack is compressed in a second direction, the second stylus is moved toward the second stylus. This is described in more detail below. The relative movement of the two stylus is detected by a linear variable differential transducer (LVDT). The LVDT signal is used to generate a spring pack movement-time curve which is reported and correlated with acquired information of other valve operator parameters, for providing an interrelated time relationship of valve operator parameters.

Therefore, an object of the present invention, when taken as a whole, is to provide a method by which the general material and operational condition of a valve and its associated operator can be determined and evaluated.

Another object of the present invention is to provide a spring pack movement monitoring device which can be used on valve operators which have side access to the spring pack.

Yet another object of the present inention is to provide an actual, dynamic valve operator spring pack movement-time trace through direct measurement of the actual spring pack.

Another object of the present invention is to provide a diagnostic interrelationship between valve stem load-time trace, motor current-time trace and torque and limit switch position-time trace.

Still another object of the present invention is to provide a specially designed, easily assembled and operated spring pack movement monitoring device to facilitate mounting of the device directly to the spring back and to monitor movement of the spring pack using the minimum of components.

Other objects, features and advantages of the present invention will become apparent upon and understanding this specification when taken in conjunction with the accompaning drawings.

BRIEF DESCRIPTION OF THE PRESENT INVENTION

A DESCRIPTION OF THE PREFERRED EMBODIMENT

Figure 1:
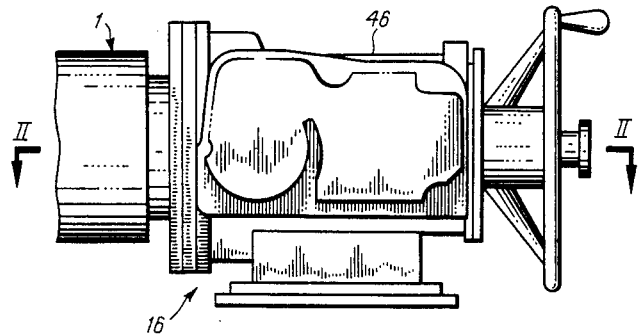
FIG. 1 is a side view of one embodiment of a valve operator used in accordance with the present invention.

Referring now in greater detail to the drawings, in which like numerals represent like components throughout the different views, FIG. 1 shows a valve operator 16 on which the preferred embodiment of the invention is used. Operator 16 is within an operating system with a prescribed flow, pressure, and temperature. The operator controls a valve (not shown) which is opened or closed as required for system control.

Figure 2:
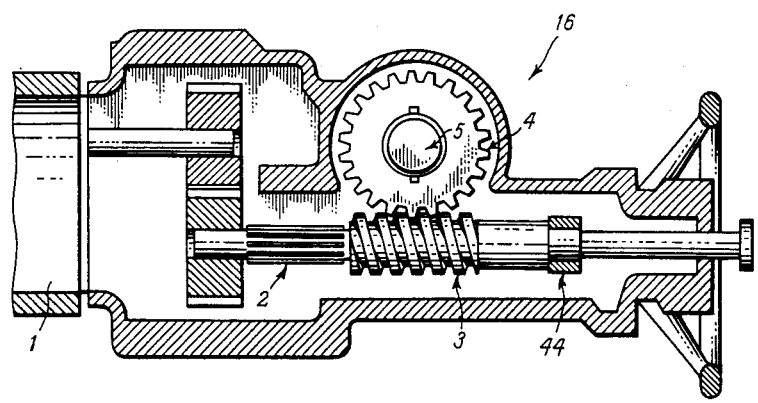
FIG. 2 is a cutaway top view of the valve operator of FIG. 1.

The operator 16 is similar to operator arrangements typically used in the art, but specifically depicts a line of valves such as the Jouvenel L - Type. The motor 1 drives a worm shaft 2, which in turn drives a worm 3, which in turn drives a worm gear 4, which in turn drives the valve stem 5, to open or close the valve. In order to absorb some of the rotating inertia of the motor and other operator components, a cluster of compression springs or spring pack 7 is provided above the worm 3 and the worm shaft 2, as shown in FIG. 2. When the valve closes or opens, the valve stem 5 will abruptly stop and even though the current to the motor 1 is interrupted, the rotational and kinetic energy of the system will cause the worm gear 4 to induce additional loads on the valve stem 5. In order to absorb some of this energy, the spring back 7 is provided and is compressed by the worm shaft 2 as the inertia of the system attempts to move the valve stem 5.

Figure 3:
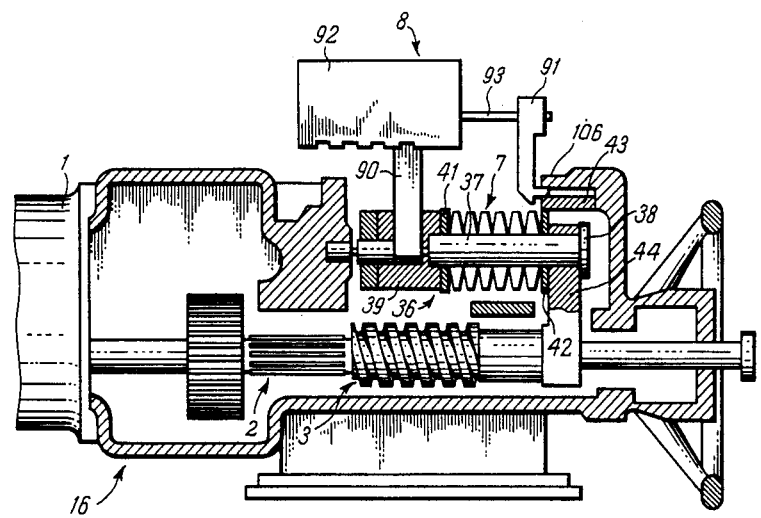
FIG. 3 is a cut-away view of a valve anaylsis and testing system, showing the valve operator of FIG. 1 with the attached spring pack movement monitoring device, in accordance with present invention.

The spring pack assembly 36 of this type operator includes a thrust shaft 37 extending axially through the spring pack 7 with the axial center line of the thrust shaft lying approximately parallel to the worm shaft 2. At one end of the thrust shaft 37 is a head element 38 and at the other end is a nut assembly 39. A first thrust washer 41 is positioned on the thrust shaft 37 between the nut assembly 39 and spring pack 7. A second thrust washer 42 is positioned on the thrust shaft 37 between the head portion 38 and the spring pack 7. The second thrust washer 42 is blocked from movement to the right, as seen in FIG. 3, by its blocking arm 43. The first thrust washer 41 is blocked from movement to the left, as seen in FIG. 3, by the nut assembly 39 and shaft 37 engagement of the operator 16 side wall. A compression collar 44 is attached to the worm 3 and extends upward to encircle the thrust shaft 37 between the head portion 38 and the second thrust washer 42. As the worm 3 moves to the left, the compression collar 44 moves the second thrust washer 42 to the left while first thrust washer 41 is blocked against leftward movement; thus the spring pack 7 is compressed. As the worm 3 moves to the right, the compression collar 44 engages the head portion 38 of thrust shaft 37 moving the shaft and nut assembly 39, and thus the first thrust washer 41 to the right, pushing on the spring pack 7, while second thrust washer 42 is blocked against rightward movement by the blocking arm 43, thus compressing spring pack 7.

SPRING PACK MOVEMENT DEVICE 8

Figure 4:
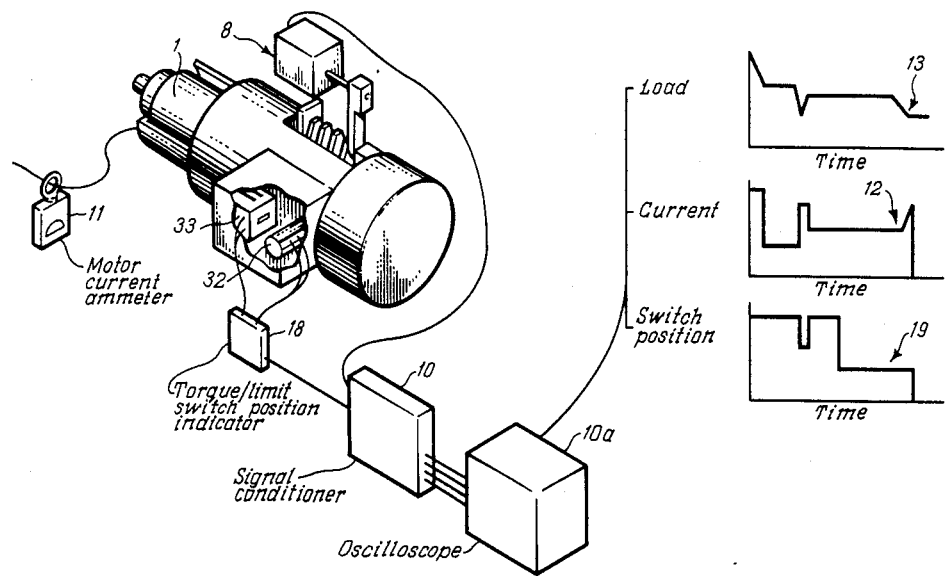
FIG. 4 is a schematic representation of a valve analysis and testing system in accordance with the present invention, showing a valve operator with attached diagnostic devices, recording device and recorded funtion-time parameters.
Figures 5, 6:
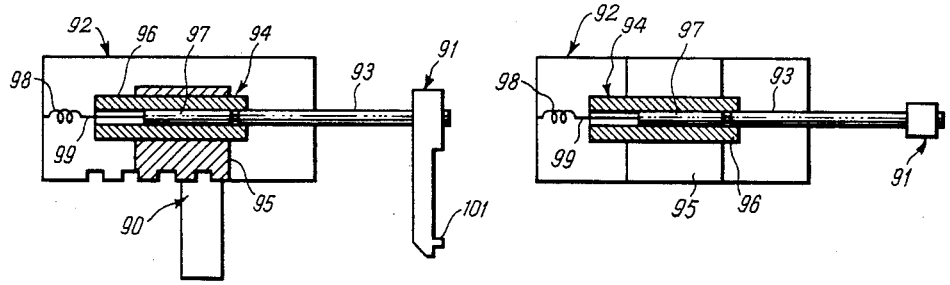
FIG. 5 is a cut-away, side view of the spring pack movement device, and related components in accordance with the present invention.
FIG. 6 is a cut-away, top view of the spring pack movement monitoring device, and related components, in accordance with the present invention.

The Spring Pack Movement Monitoring Device 8 is shown in detail in FIGS. 3, 4 and 5. The function of this spring pack movement monitoring device 8 is to monitor, both statically and dynamically, the linear (axial) motion of the operator's spring pack 7. Monitoring of the spring pack 7 motion, in the preferred embodiment of this invention, is accomplished through monitor and measurement of the relative movement of components within the spring pack assembly 36. The spring pack movement measuring device 8 comprises a first spring pack assembly engaging element 90 (hereinafter also referred to as the first stylus 90) and a second spring pack assembly engaging element 91 (hereinafter also referred as the second stylus 91). Mounted to the first stylus is a housing 92; and mounted to the second stylus 91 is a rod element 93 which extends into the housing 92. Within the housing 92 is mounted a linear variable differential transducer ("LVDT" 94). LVDT 94 is of a type typically known in the industry. The LVDT 94 is mounted by a bracket 95 within the housing 92. The LVDT coil element 96 is held stationary within the housing 92 by the bracket 95. The LVDT core 97 is moveable within the coil element 96. Rod element 93 is connected to the core 97 and functions as a rigid extention of the core. Since the housing 92 is attached to the first stylus 90 and the rod element 93 is attached to the second stylus 91, relative movement of the first and second stylus results in relative movement between the LVDT core 97 and LVDT coil element 96, whereby the LVDT 94 detects relative movement in accordance with its known mode of operation. A spring 98 connected by wire 99 to the core 97 maintains tension in the LVDT 94.

The spring pack movement monitoring device 8, in use, is mounted piggy-back to the spring pack assembly 36. Access to the spring pack assembly 36 is obtained by removal of the coverplate 46 (see FIG. 1). The first stylus 90 is removably clamped to the nut assembly 39 of the spring pack assembly 36, such that the first stylus moves without slippage with the nut assembly. Thus, the housing is rigidly mounted above and movable with the nut assembly 39.

Figure 9:
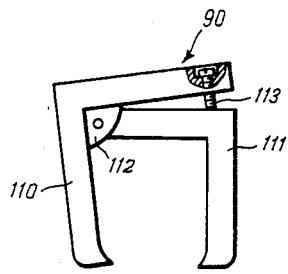
FIG. 9 is a front view of a special clamp (stylus) used in conjunction with the spring pack monitoring device of the present invention.

The position of the housing 92 is adjustable along the stylus 90 to accomodate spring pack assemblies 36 of varying lengths. The first stylus 90 comprises a uniquely functioning clamping device seen in greater detail in FIG. 9. A first claw element 110 is pivotally connected to a second claw element 111 by a hinge 112. An adjustment screw 113 adjustably sets the relative pivotal distances between the two claw elements 110, 111. In use, with the screw 113 drawn all the way out, the two claw elements 110, 111 are placed over the nut assembly 39. The screw 113 is then driven into force relative pivoting of the claw elements thus resulting in secure gripping of the nut assembly by the first stylus 90. Second stylus 91 is uniquely constructed to define a distinctive foot element 101 which catches the periphery of the second thrust washer 42 such that, as the second thrust washer moves to the left it engages the foot element 101 and moves the second stylus 91 to the left with the second thrust washer. As the second thrust washer 91 moves to the right, the second stylus is moved to the right through the action of spring 98 acting upon the rod element 93.

Figure 10:
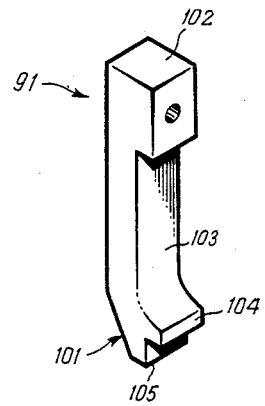
FIG. 10 is a pictorial view of special washer engaging stylus used in accordance with the present invention.

The second stylus 91, as seen in detail in FIGS. 3 and 10 is comprised of the rod connecting portion 102, the elongated body 103 and the foot element 101. The foot element 101 defines a washer engaging notch 105 which angles slightly upward to fit the approximate contour of the second thrust washer 42 periphery. In various embodiments, the notch 105 forms a curve or a straight line, angled upward, to accomodate the degree of curvature of the wahser 42 where contact is to be made. The contour of the foot element 101 and body 103 is formed to avoid the casing edge 106 during movement. Also, the toe 104 of foot element 101 fits between the casing 106 and the washer 42.

Thus, in operation, as the worm 3 moves to the right, compression collar 44, acting on thrust shft 37 as previously described, moves the first thrust washer 41 to the right (as seen in FIG. 3) as previously described to compress the spring pack 7. As the nut assembly 39 and first thrust washer 41 move to the right, the first stylus 90 and housing 92 move with the nut assembly. The second stylus 91 is blocked from right movement by its engagement of the second thrust washer 42. Thus, the two styli 90, 91 are moved relative to one another by compression of the spring pack 7 as the worm 3 moves to the right side. Conversely, as the worm 3 moves to the left side, the compression collar 44 moves the secodn thrust washer 42 to compress the spring pack 7 as described above. In this case, the second stylus 91 is moved to the left together with the second thrust washer 42 while the first stylus, and thus housing 92, is held stationary together with the nut assembly 39. Thus, again, the two styli 90, 91 are moved relative to one another in direct relationship to the compression of the spring pack 7. The LVDT core 97 and reference element 96 are moved relative to one another as result of movement of the second and first styli 90, 91, respectively. Thus, the spring pack 7 movement is traced electronically and this movement is displayed on an analytical device such as an oscilloscope 10a (FIG. 4), hereinafter known generally as the recorder 10a.

Typically, the valve operator 16, of the type being analyzed and tested by the present invention is not readily outfitted for field testing of the initital or subsequent stem loads used to correlate spring pack movement and stem load. Accordingly, a user of the present invention must rely on initial factory supplied specifications of stem load and spring pack movement correlation for initial calibration. If the valve operator is of a type that can be practially field calibrated for stem thrust, a user is directed to the stem load calibration device 17 of the 649 Patent.

CHANNEL SELECTOR AND SIGNAL CONDITIONER DEVICE—10

The purpose of the Channel Selector and Signal Conditioner Device 10 is as follows: (Refer to FIG. 4.)
1. Provide a conditioned power supply of the LVDT of the spring pack movement monitoring device 8 and torque/limit switch position indicating device 18.
2. House the electronic circuitry (see FIG. 7) for the detection of the limit and torque switch position. This circuit will be discussed in more detail to follow.
3. Provide the necessary sub-components for switching capabilities to enable the user to output any of the following signals to the data collection system: spring pack movement, load cell, motor current, and torque/limit control circuit switch position.
4. Provide input and output connections for an external motor current measuring device 11.
5. Provide local digital readout capabilities for spring pack movement device 8.
6. Provide an output signal for verifying power operation of the recording device 10a.

LIMIT/TORQUE SWITCH POSITION DEVICE—18

Figures 7, 7A:
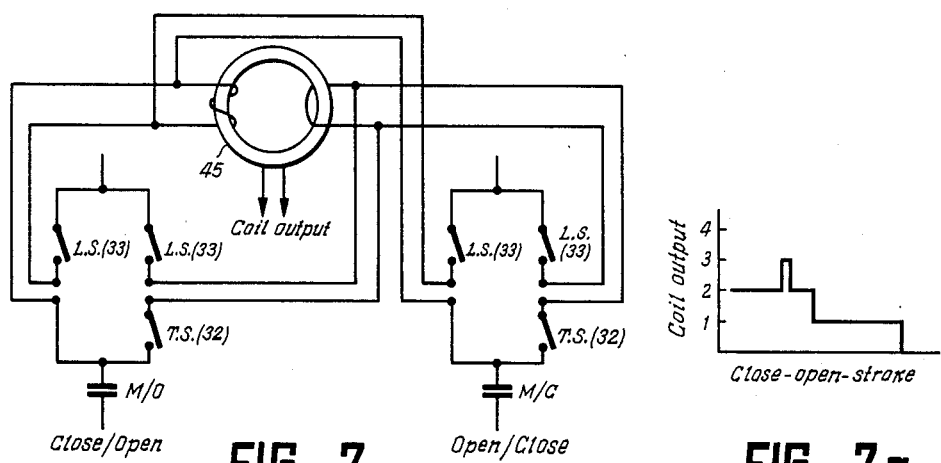
FIG. 7 is an electrical schematic showing the design of a switch position indicating circuitry and sub-components used in accordance with the present invention.
FIG. 7A is a sample trace from the magnetic coil of the switch position device, in accordance with the present invention.

The limit/torque switch position device 18 comprises a sensing circuit and associated electronics which are housed in the Channel Selector and Conditioning Device 10. As can be seen from the electrical schematic diagram, FIG. 7, the circuit will provide a varying output to the recording device 10a depending on which of the switches (Limit 33, or Torque 32) are closed or opened. It should be noted that if valve 15 is being operated, only one of the contacts identified as M/C or M/O (FIG. 7) will be closed, depending on whether the valve is being opened or closed. A sample trace from the magnetic coil 45 is shown in FIG. 7A for ease of understanding. Note that the variable output shown in the sample trace is obtained by looping the signal wire from one side of the parallel control circuit around the magnetic coil more times than the signal wire from the other parallel path. The result of this embodiment of the invention is an output to the recording devece 10a, whose magnitude is reflective of which of the two parallel paths, or both, has its associated switches opened or closed.

CURRENT MEASURING DEVICE—11

The Current Measuring Device 11 is used to monitor the current draw of the valve operator motor 1 during the operation of the valve. The power required to operate the valve can be directly correlated to the actual delivered stem thrust of the operator 16, and thus, corresponding traces (curves) for the stem load 13 and motor current 12 will be obtained. By initial comparison of the two curves 12 and 13, the user can subsequently obtain either one of the signature traces 12 or 13, and have sufficient information on the performance of the valve/opeator assembly. The desirability of the current signature trace 12 lies in the fact that it is generally easier to obtain than the stem load curve 13. The component which is preferably used to obtain the motor current trace 12 is a clamp-on Ampmeter 11 which is well known to those familiar with the state-of-the-art. The signal output of the motor current measuring device 11 is sent to the Channel Selector and Conditioning Device 10 which has been described previously.

RECORDER—10a

The Recorder 10a is intended to acquire and store the input data for subsequent display on a screen, or hardcopy printer, for analysis and/or record purposes. Typical recording devices 10a used for the above purposes are well known to those familiar with the state-of-the-art.

The interrelationship of the above described components of the preferred embodiment of the valve analysis and testing system of the present invention is shown in FIG. 4.

Figure 8:
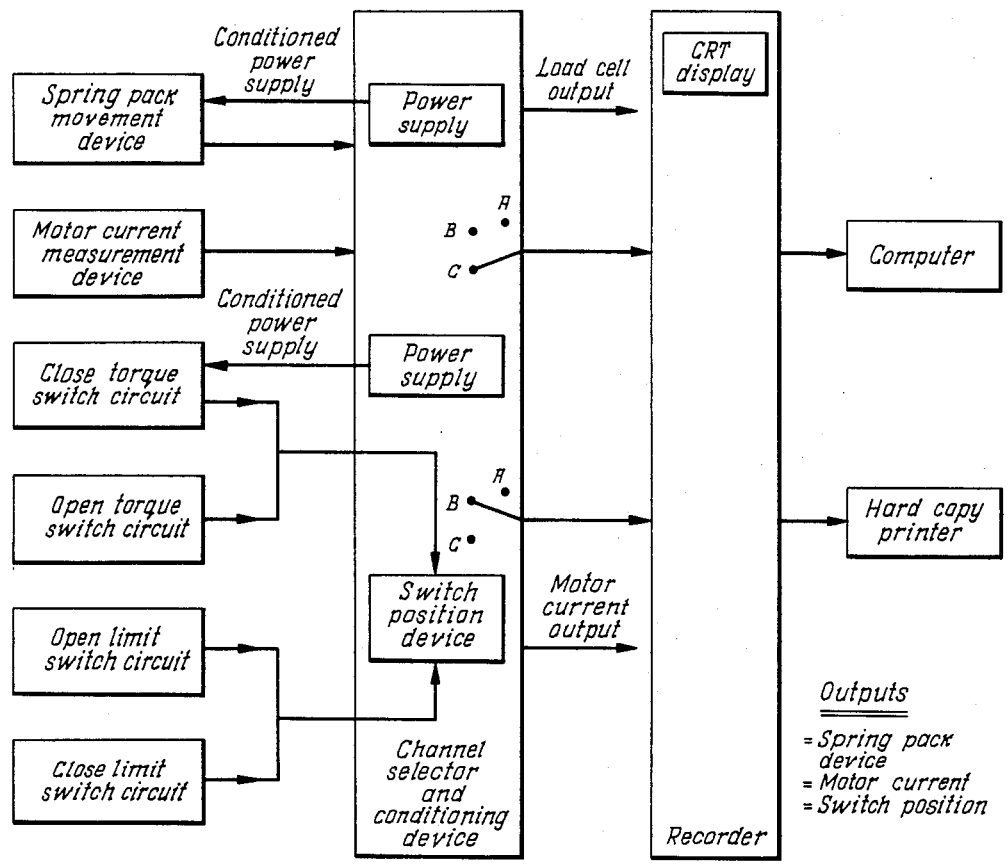
FIG. 8 is an electrical block diagram showing how the system signals are obtained and processed, in accordance with the present invention.

An electrical block diagram of the invention is provided as FIG. 8, to show how the electrical signals are obtained and processed by each of component parts, also, referred to as component subsystems.

Referring to FIG. 4 and having established the valve stem 5 load and spring pack 7 movement relationship, either by use of factory specs or use of the stem load calibration device of the 649 Patent, and connecting the spring pack movement device 8 to the channel selector and conditioning device 10, the spring pack 7 movement (which is indicative of actual stem load) as a function of time can be recorded as a stem load trace 13 for any operation cycle of the valve. In addition, the motor current measuring device 11 is given to provide a current trace 12, and can be correlated to the stem load trace 13 for further operator and valve performance evaluation, as defined later.

As seen in FIG. 4, the valve operator 16 includes a torque switch 32 and limit switch 33 (located within the indicated control box 40, but not seen here), which are connected and function in a manner known in the art. A torque/limit switch position indication device 18 is electrically wired into the torque switch 32 and limit switch 33 control curcuit, as shown in FIG. 7. The output from the torque/limit switch position device 18 is connected to the recording device 10a, via the channel selector and conditioning device 10, which in turn provides a switch on-off-time trace 19, also called torque/limit switch position-time trace 19, for the duration of the operator cycle.

When the spring pack measuring device 8, motor current measuring device 11, and the torque/limit switch position indication device 18 are activated simultaneously and recordings of each, with reference to the same operator cycle-time, are obtained, the relationship of the recordings provide diagnostic data. To be more specific, since the spring pack 7 movement is calibrated to the valve stem 5 load, the spring pack movement trace is a direct dynamic stem load-time relationship for an operator cycle. Thus, the spring pack trace corresponds to actual stem load. As a result of the correlation, the stem load trace 13 is also a spring pack movement trace 13 and will be used interchangeably in subsequently describing the invention. The current measuring device 11 measures the current required by the operator motor to deliver the stem load and, therefore, the current-time trace 12 is also a record of the valve stem load-time relationship. In addition, the torque/limit switch indicating device 18 provides a switch position indication for the torque and limit siwtches 32 and 33, therefore the torque/limit switch position-time trace 19 provides a direct indication of the torque and limit switch timing relationship. Most important is that the torque and limit switch "off" indication can be compared to the stem load trace 13 to establish the additional stem loads delivered to the stem by the inertia of the motor and operator 16, after the torque and limit switches 32 and 33, have interrupted the current to the motor. It is recognized that the stem load trace 13 is a direct record of the dynamic valve stem load during the valve operator cycle, and therefore provides confirmation of the actual load imposed on the valve stem 5. If the recorded stem load is less than, or greater than, that required for proper valve operation, the traces 12, 13 and 15, are compared and the comparisons are used to readjust the torque switch 32 and/or limit 33 switch settings, and therefore the stem load to within required limits.

Further a spring pack movement or stem load trace 13, current trace 12, and switch position trace 19, generated from a properly functioning valve and operator combination, can be used as a data base for comparison of subsequent spring pack movement, current and switch position indication traces for purposes of verification of performance, or as a means of detecting improper functioning components of the valve 15 and operator 16.

In preferred embodiments, the process of comparision and analysis of the data is accomplished through the use of computer data bases and specialized programs which calculate and compare critical valve and operator 16 parameters. This historical comparison identifies to the user a slowly degrading condition, which heretofore could not be readily detected between sequential test frequencies.

Typical valve and operator parameters which are determined and compared from the dynamic traces 12, 13, and 19 are as follows:

A. Stem load versus spring pack 7 deflection. As stated, this information is acquired from factory specifications or by use of the steam load calibration device of the 649 Patent. Correlation of these two parameters provides the user with a known stem load for a given, subsequently obtained, spring pack movement.

B. Valve packing load changes.

C. Starting stem load to initially move the valve from its closed or open position, commonly known in the state-of-the art as hammer blow.

D. Total stem load, which is the final observed stem load at the end of a given valve cycle.

E. Available stem load to seat a valve. This load is the difference between the packing load and load at torque switch trip.

F. Stem load at which the torque or limit switches actuate.

This provides information of the over-all operational set-up of a valve and operator control circuitry.

G. Total time for the valve to open or close.

H. General condition of the operator mechanical gearing and stem, by analysis of the valve mid-cycle stem load trace 13.

I. Average motor current requirements, which if it changes, can provide an indication of degrading valve performance.

An example of a computer program, which is part of the invention to perform the above analytical manipulations, is shown following:

This is an example computer program for analysis of motor operated valve spring pack 7 movement, motor current (at current measuring device 11) and torque/limit switch 32 and 33 activation. This program is written for the Norland 3000 DMX computer.

Program listing:

1. Display B C C'D E'RO DPLY
2. O>B
3. O>C
4. O>C'
5. O>D
6. O>E'
7. O>RO
8. PAUS
9. PAUS
10. O IF>RI
11. D DISK 101
12. D DISK 102
13. D DISK 103
14. D DISK 104
15. D DISK 105
16. D DISK 106
17. D DISK 107
18. D DISK 108
19. D DISK 109
20. D DISK 110
21. D DISK 111
22. D DISK 112
23. D DISK 113
24. D DISK 114
25. END
26. PAUS
27. PAUS
28. DPLY A>DISK 104
29. DISK 104 LBL DATE LBL
30. DPLY A'>DISK 105
31. DISK 105 LBL TIME LBL
32. IPLY D'>DISK 111
33. DISK 111 LBL LOAD COV LBL
34. PAUS
35. PAUS
36. DPLY Q1>DISK 101
37. DISK 101 LBL Q1 CURVE LBL
38. DPLY Q2>DISK 102
39. DISK 102 LBL Q2 CURVE LBL
40. DPLY Q3>DISK 103
41. DISK 103 LBL Q2 CURVE LBL
42. PAUS
43. PAUS
44. RMS>C'
45. COOR
46. C'>R8
47. O IF>V
48. O IF>V'
49. C'* −1>C'
50. GOTO 61
51. END
52. GOTO 119
53. END
54. O IF>V'
55. O IF>V
56. C'* −1>C'
57. GOTO 61
58. END
59. GOTO 119
60. END
61. PAUS
62. PAUS
63. COOR
64. H'−H>D
65. PAUS
66. PAUS
67. COOR
68. C'−V>E
69. E * D'>E
70. PAUS
71. PAUS
72. COOR
73. V'−V>C
74. C * D'>C
75. PAUS
76. PAUS
77. RMS>B'
78. B'>R9
79. COOR
80. O IF>V
81. O IF>V'
82. B'* −1>B'
83. GOTO 94
84. END
85. GOTO 119
86. END
87. O IF>V'
88. O IF>V
89. B'* −1>B'
90. GOTO 94
91. END
92. GOTO 119
93. END
94. B'* D'>B
95. R9−R8>RO
96. RO * D'>RO
97. PAUS
98. PAUS
99. COOR
100. C'−V>E'
101. E'* D'>E'
102. C'* D'>C'
103. DPLY B>DISK 106
104. DISK 106 LBL RUNNG UBS LABL
105. DPLY B'>DISK 107
106. DISK 107 LBL RUNNG V LABL
107. DPLY C>DISK 108
108. DISK 108 LABL AVA THRST LABL
109. DPLY C'>DISK 109
110. DISK 109 LABL PRE HB RMS LABL
111. DPLY D>DISK 110
112. DISK 110 LABL TIME O/C LABL
113. DPLY E>DISK 112
114. DISK 112 LABL PKHB/RMS LABL
115. DPLY E'>DISK 113
116. DISK 113 LABL TTL THRST LABL
117. DPLY RO>DISK 114
118. DISK 114 LABL DKNG LD LABL
119. END Whereas, this invention has been described in detail with particular reference to preferred embodiments thereof, it will be understood that variations and modifications can be effected within the spirit and scope of the invention, as described before and as defined in the appended claims.

We claim:

1. A spring pack movement monitoring device for monitoring the movement of the spring pack found within a valve operator, wherein the valve operator includes a driven worm shaft, which in turn drives a worm, whcih in turn drives a worm gear, which in turn drives a valve stem to open and close a valve attached to the valve stem, a spring pack mounted in parallel with the worm shaft for compression in response to movement of the worm, and wherein the valve operator further includes a thrust shaft extending axially through the spring pack with the axial centerline of the thrust shaft lying approximately parallel to the worm shaft, the thrust shaft comprising a forward end and a rear end, a first thrust washer positioned along the thrust shaft to the rear end of the thrust shaft behind the spring pack, a second thrust washer positioned along the thrust shaft to the forward end of the thrust shaft in front of the spring pack, blocking means associated with the thrust shaft and the first and second thrust washers for selectively blocking rearward movement of the first thrust washer and blocking forward movement of the second thrust washer, a linking collar for communicating between the worm and the thrust shaft and second thrust washer to effect forward movement of the thrust shaft in response to a forward movement of the worm and to effect rearward movement of the second thrust washer in response to rearward movement of the worm, whereby forward movement of the thrust shaft causes forward movement of the first washer to compress the spring pack against the second washer and whereby rearward movement of the second thrust washer compresses the spring pack against the first washer; said spring pack movement monitoring device comprising:

movement sensing means for sensing movement between first and second reference elements movable realtive to one another;

first stylus member in communication with both said first reference element of said movement sensing means and the first thrust washer of the valve operator, said first stylus member being movable in response to movement of said first thrust washer to effect a movement of said first reference element relative to said second reference element of said movement sensing means;

a second stylus member in communication with both said second refrence element of said movement sensing means and the second thrust washer of the valve operator, said second stylus member being moveable in response to movement of said second thrust washer to effect a movement of said second reference element relative to said first reference element of said movement sensing means;

means for detecting the relative movement between said first reference element and said second reference element of said movement sensing means;

means for recording the detected movement between said first and second reference elements.

2. Spring pack movement monitoring device of claim 1, further comprising:

means for providing a spring pack movement/time curve in response to the detected movement within said movement sensing device; and means for correlating said spring pack movement/time curve to predetermined stem load values to provide a stem load/time curve.

3. Spring pack movement monitoring device of claim 1, wherein said first reference element is mounted in fixed relationship to said first stylus member and said second reference element is mounted in fixed relationship to said second stylus member.

* * * * *